US012122627B2

(12) United States Patent
Takahashi et al.

(10) Patent No.: US 12,122,627 B2
(45) Date of Patent: Oct. 22, 2024

(54) SHEET SORTING APPARATUS

(71) Applicant: CANON KABUSHIKI KAISHA, Tokyo (JP)

(72) Inventors: Genki Takahashi, Mishima (JP); Kazuhisa Sato, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/355,100

(22) Filed: Jul. 19, 2023

(65) Prior Publication Data

US 2023/0365369 A1 Nov. 16, 2023

Related U.S. Application Data

(63) Continuation of application No. 16/951,918, filed on Nov. 18, 2020, now Pat. No. 11,745,971, which is a (Continued)

(30) Foreign Application Priority Data

Nov. 29, 2017 (JP) ................................ 2017-229295
Sep. 28, 2018 (JP) ................................ 2018-184602

(51) Int. Cl.

*B65H 31/22* (2006.01)
*B65H 29/58* (2006.01)
*B65H 31/24* (2006.01)
*B65H 33/14* (2006.01)
*G03G 15/00* (2006.01)

(52) U.S. Cl.

CPC ............ *B65H 31/22* (2013.01); *B65H 29/58* (2013.01); *B65H 31/24* (2013.01); *B65H 33/14* (2013.01); *G03G 15/6538* (2013.01); *G03G 15/6552* (2013.01); *B65H 2408/11* (2013.01);

(Continued)

(58) Field of Classification Search

CPC ........ B65H 29/58; B65H 29/60; B65H 31/22; B65H 31/24; B65H 31/32; B65H 33/14; B65H 2408/111; B65H 2408/11; B65H 2408/113; B65H 2408/1131; B65H 2511/152; B65H 2511/15; G03G 15/6538;

(Continued)

(56) References Cited

U.S. PATENT DOCUMENTS 10,870,552 B2 * 12/2020 Takahashi .......... G03G 15/6538
11,745,971 B2 * 9/2023 Takahashi .............. B65H 31/24 271/302

FOREIGN PATENT DOCUMENTS

JP 2000044105 A * 2/2000

* cited by examiner

*Primary Examiner* — Jeremy R Severson

(74) *Attorney, Agent, or Firm* — Canon U.S.A., Inc. IP Division

(57) ABSTRACT

A sheet sorting apparatus comprising a first tray, a second tray, a conveyance unit, a tray detection unit, a stacking amount detection unit, and a control unit configured to control the conveyance unit to not convey the sheet to the second tray, in a case where the stacking amount detection unit detects that the amount of sheets reaches the predetermined amount, wherein the control unit is configured to permit the conveyance unit to convey the sheet to the second tray, in a case where the tray detection unit detects that the first tray is detached from the apparatus main body in a state where the stacking amount detection unit detects that the amount of sheets reaches the predetermined amount and conveyance of the sheet to the second tray by the conveyance unit is stopped.

5 Claims, 12 Drawing Sheets

Related U.S. Application Data continuation of application No. 16/201,180, filed on Nov. 27, 2018, now Pat. No. 10,870,552.

(52) U.S. Cl.
CPC .................... *B65H 2511/15* (2013.01); *G03G 2215/00911* (2013.01); *G03G 2221/1696* (2013.01)

(58) Field of Classification Search
CPC ..... G03G 2215/00911; G03G 15/6552; G03G 2221/1696
See application file for complete search history.

FIG.6A

| DISCHARGE TRAY | 210 | 211 | 212 |
|---|---|---|---|
| STATE OF TRAY | VACANT | FULLY LOADED | VACANT |
| DISCHARGE PORT | 203 | 204 | 205 |
| STATE OF DISCHARGE PORT | VACANT | FULLY LOADED | VACANT |

FIG.6B

| DISCHARGE TRAY | 210 | 211 | 212 |
|---|---|---|---|
| STATE OF TRAY | NO TRAY | VACANT | VACANT |
| DISCHARGE PORT | 203 | 204 | 205 |
| STATE OF DISCHARGE PORT | VACANT | FULLY LOADED | VACANT |

FIG.6C

| DISCHARGE TRAY | 210 | 211 | 212 |
|---|---|---|---|
| STATE OF TRAY | VACANT | VACANT | VACANT |
| DISCHARGE PORT | 203 | 204 | 205 |
| STATE OF DISCHARGE PORT | VACANT | VACANT | VACANT |

SHEET SORTING APPARATUS

CROSS-REFERENCE TO RELATED APPLICATIONS

The present application is a continuation of U.S. patent application Ser. No. 16/951,918, filed on Nov. 18, 2020, which is a continuation of U.S. patent application Ser. No. 16/201,180, filed on Nov. 27, 2018, and issued as U.S. Pat. No. 10,870,552 on Dec. 22, 2020, which claims priority from Japanese Patent Application No. 2017-229295 filed Nov. 29, 2017, and from Japanese Patent Application No. 2018-184602 filed Sep. 28, 2018, which are hereby incorporated by reference herein in their entireties.

BACKGROUND OF THE INVENTION

Field of the Invention

The present invention relates to a sheet sorting apparatus and an image forming apparatus which include a plurality of discharge trays including a detachable one(s).

Description of the Related Art

Some conventional image forming apparatuses are equipped with a sheet sorting apparatus which includes a plurality of discharge trays. The sheet sorting apparatus sorts out sheets, for example, by discharging the sheets to different discharge trays user by user.

Japanese Patent Application Laid-Open No. 2000-44105 discusses a sheet sorting apparatus including a plurality of discharge trays detachable from its apparatus main body. For example, the plurality of discharge trays includes a first tray and a second tray that is arranged under the first tray. A sheet stacking space of the second tray can be extended to increase the maximum number of sheets stackable on the second tray by detaching the first tray.

However, Japanese Patent Application Laid-Open No. 2000-44105 includes no discussion of control for situations where the first tray is detached in a state where the second tray is fully loaded.

SUMMARY OF THE INVENTION

The present invention is directed to improving usability in a case where a discharge tray arranged above one detected to be fully loaded is detached from the apparatus main body.

According to an aspect of the present invention, a sheet sorting apparatus includes a first tray detachable from an apparatus main body, a second tray arranged vertically below the first tray, a conveyance unit configured to convey a sheet to either of the first and the second trays, a tray detection unit configured to detect that the first tray is detached from the apparatus main body, a stacking amount detection unit configured to detect that an amount of sheets stacked on the second tray reaches a predetermined amount, and a control unit configured to control the conveyance unit not to convey the sheet to the second tray, in a case where the stacking amount detection unit detects that the amount of sheets reaches the predetermined amount, wherein the control unit permits the conveyance unit to convey the sheet to the second tray, in a case where the tray detection unit detects that the first tray is detached from the apparatus main body in a state where the stacking amount detection unit detects that the amount of sheets reaches the predetermined amount and conveyance of the sheet to the second tray by the conveyance unit is stopped.

Further features of the present invention will become apparent from the following description of exemplary embodiments with reference to the attached drawings.

BRIEF DESCRIPTION OF THE DRAWINGS

FIGS. 6A, 6B, and 6C illustrate setting examples of states of discharge trays and discharge ports.

DESCRIPTION OF THE EMBODIMENTS

A first exemplary embodiment describes a configuration using a flag type full load detection sensor.

<Configuration Diagram of Image Forming Apparatus>

Figure 1:
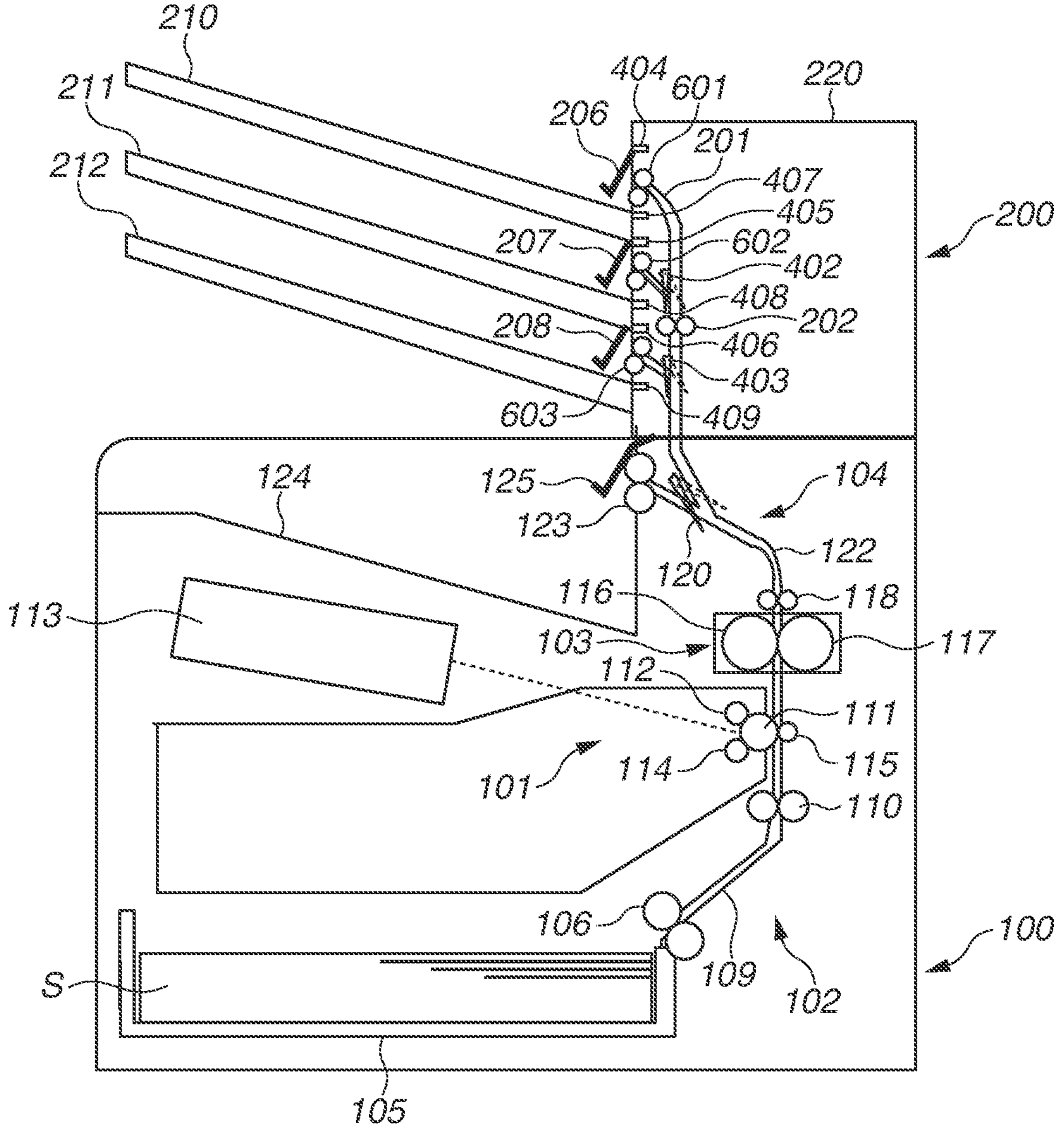
FIG. 1 is a diagram illustrating a configuration of an image forming apparatus and a sheet sorting apparatus according to a first exemplary embodiment.

FIG. 1 is a diagram illustrating a schematic structure of an image forming apparatus according to the first exemplary embodiment of the present invention. In the present exemplary embodiment, a laser beam printer 100 (hereinafter, referred to as a printer 100) is described as an example of the image forming apparatus.

As illustrated in FIG. 1, the printer 100 includes an image forming unit 101, a feeding unit 102, a fixing unit 103, and a discharge unit 104. The feeding unit 102 feeds a sheet S (recording material), such as a sheet of paper, to the image forming unit 101. The fixing unit 103 fixes an image formed on the sheet S by the image forming unit 101. A sheet sorting apparatus 200 is arranged above the printer 100. The sheet sorting apparatus 200 receives image-formed sheets S from the printer 100 and sorts out the sheets S.

The image forming unit 101 includes a photosensitive drum 111, a charging roller 112, and an exposure device 113. The photosensitive drum 111 rotates counterclockwise in FIG. 1. The charging roller 112 charges a surface of the photosensitive drum 111. The exposure device 113 irradiates the charged photosensitive drum 111 with light to form an electrostatic latent image on the photosensitive drum 111. The image forming unit 101 further includes a developing device 114 and a transfer roller 115. The developing device

114 applies toner to the electrostatic latent image to form a toner image on the photosensitive drum 111. The transfer roller 115 transfers the toner image to a conveyed sheet S. The image forming unit 101 forms a toner image on a sheet S by such an image forming process. The fixing unit 103 further includes a fixing roller 116 and a pressure roller 117 which forms a fixing nip portion with the fixing roller 116. The fixing unit 103 fixes the transferred toner image to the sheet S by applying heat and pressure to the sheet S.

The feeding unit 102 includes a cassette 105, a feed roller 106, a conveyance guide 109, and a registration roller 110. A plurality of sheets S for image formation is stacked and stored in the cassette 105. The discharge unit 104 includes a switching member 120, a fixing discharge roller 118, a discharge guide 122, a discharge roller 123, a discharge tray 124, and a full load detection flag 125. In a case where the full load detection flag 125 detects that the discharge tray 124 is fully loaded, the printer 100 does not discharge a sheet S to the discharge tray 124 until the sheets S discharged to the discharge tray 124 are removed.

The switching member 120 is configured to be movable, by a not-illustrated actuator, to a solid-lined position for guiding the image-formed sheet S to the sheet sorting apparatus 200 and to a broken-lined position for guiding the image-formed sheet S to the discharge tray 124.

<Configuration Diagram of Sheet Sorting Apparatus>

The sheet sorting apparatus 200 according to the present exemplary embodiment will be described with reference to FIG. 1. A conveyance guide 201 guides the sheet S conveyed from the printer 100. The conveyance guide 201 includes a plurality of branches, at the ends of which discharge trays 210, 211, and 212 are provided, respectively. A conveyance roller pair 202 and discharge roller pairs 601, 602, and 603 discharge the sheet S to any one of the discharge trays 210, 211, and 212. The discharge trays 210, 211, and 212 are configured to be arbitrarily detachable from an apparatus main body 220 (also referred to as a housing) of the sheet sorting apparatus 200. A switching member 402 and a switching member 403 are configured to be movable by not-illustrated actuators to solid-lined positions and broken-lined positions in FIG. 1. For example, in a case of discharging the sheet S to the discharge tray 210, the switching members 402 and 403 are moved to the respective solid-lined positions in FIG. 1. In a case of discharging the sheet S to the discharge tray 211, the switching member 402 is moved to the broken-lined position in FIG. 1, and the switching member 403 is moved to the solid-lined position in FIG. 1.

Tray detection sensors 407, 408 and 409 are sensors for detecting whether the discharge trays 210, 211, and 212 are detached from the apparatus main body 220, respectively. For example, the tray detection sensors 407, 408, and 409 are photointerrupters. The tray detection sensors 407, 408, and 409 output an OFF signal in a light transmission state where the discharge trays 210, 211, and 212 are detached from the apparatus main body 220 and the light of the respective photointerrupters is not blocked. The tray detection sensors 407, 408, and 409 output an ON signal in a light blocked state where the discharge trays 210, 211, and 212 are attached to the apparatus main body 220 and the light of the respective photointerrupters is blocked.

Full load detection flags 206, 207, and 208 are flags that move in contact with the surface of the sheet S discharged to the discharge trays 210, 211, and 212, respectively. Full load detection sensors 404, 405, and 406 are sensors for detecting that the discharge trays 210, 211, and 212 are fully loaded, respectively. For example, the full load detection sensors 404, 405, and 406 are photointerrupters. The full load detection sensors 404, 405, and 406 output an OFF signal in a light transmission state where light is not blocked by the full load detection flags 206, 207, and 208. As sheets S are discharged to the discharge trays 210, 211, and 212, the full load detection flags 206, 207, and 208 move. The full load detection sensors 404, 405, and 406 output an ON signal in a light blocked state where the light is blocked by the full load detection flags 206, 207, and 208. As employed herein, being fully loaded refers to a state in which the amount of sheets S discharged and stacked on the discharge tray 210, 211, or 212 reaches or exceeds a predetermined amount. In the present exemplary embodiment, the full load detection flag 207 is configured to be detachable from the apparatus main body 220 integrally with the discharge tray 210, and the full load detection flag 208 with the discharge tray 211. In other words, the full load detection flag 207 is attached to the discharge tray 210, and the full load detection flag 208 is attached to the discharge tray 211.

<Block Diagram of Control Units and Functional Configuration>

Figure 2:
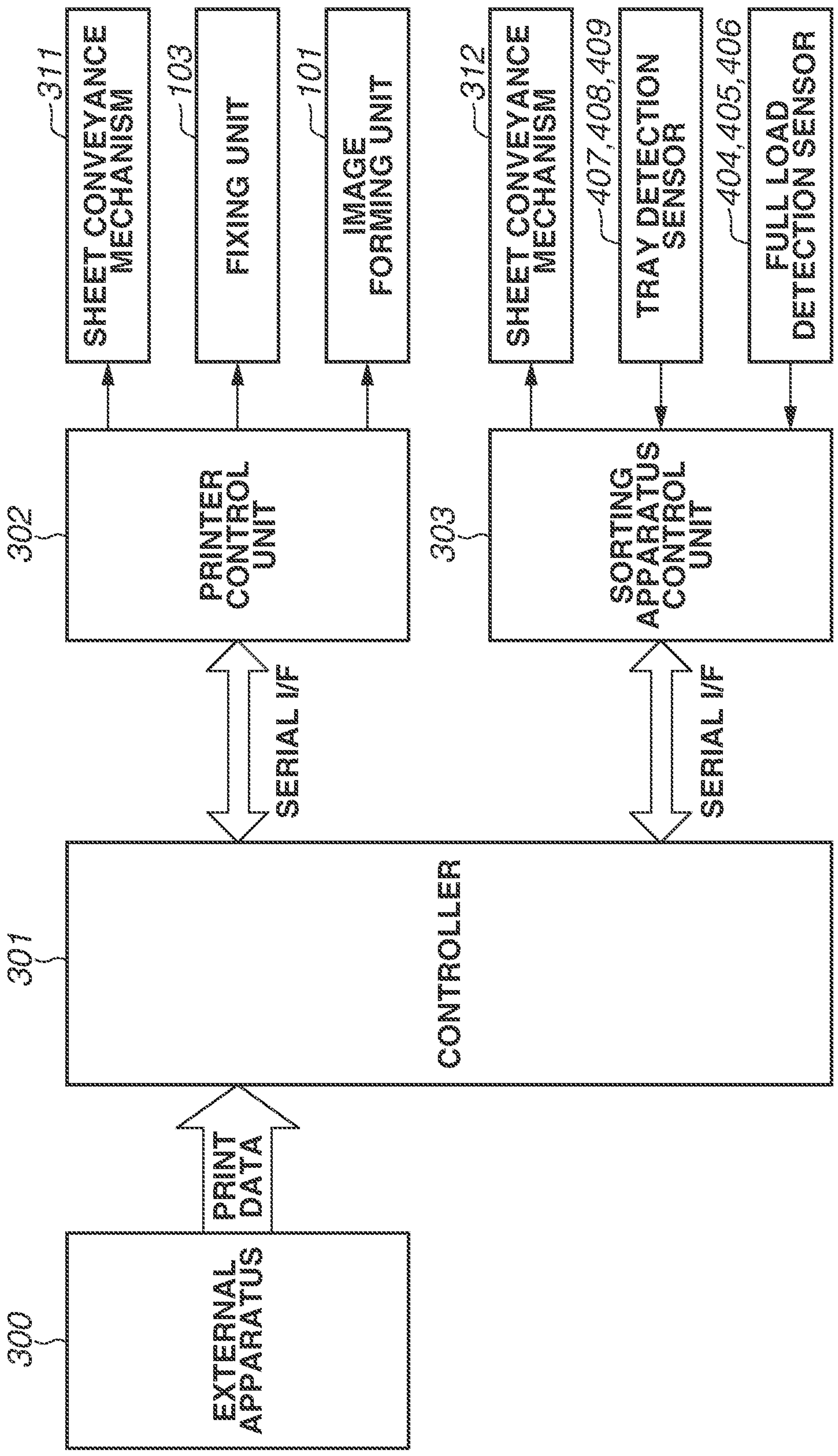
FIG. 2 is a block diagram illustrating a control unit and a functional configuration of the image forming apparatus according to the first exemplary embodiment.

FIG. 2 is a block diagram illustrating a functional configuration according to the present exemplary embodiment. The printer 100 includes a controller 301 as its control units, a printer control unit 302 which controls the printer 100, and a sorting apparatus control unit 303 which controls the sheet sorting apparatus 200. The controller 301 communicates with an external apparatus 300 such as a host computer, and receives print data. The controller 301 specifies print conditions generated from the print data and issues print instructions to the printer control unit 302 via a serial interface (I/F). The printer control unit 302 controls various mechanisms according to the print conditions received from the controller 301. Specifically, the printer control unit 302 controls a sheet conveyance mechanism 311, which includes the feeding unit 102 and the discharge unit 104, to feed and discharge a sheet S. The printer control unit 302 controls the image forming unit 101 and the fixing unit 103 to perform image formation and fixing on the sheet S.

The controller 301 specifies sort destinations of sheets S for the sorting apparatus control unit 303 via a serial I/F. The sorting apparatus control unit 303 controls various mechanism according to the sort destinations received from the controller 301. Specifically, the sorting apparatus control unit 303 controls a sheet conveyance mechanism 312, which includes the conveyance roller pair 202, the discharge roller pairs 601, 602, and 603, and the switching members 402 and 403, to convey image-formed sheets S. The sorting apparatus control unit 303 detects a presence or an absence of the discharge trays 210, 211, and 212 based on detection results of the tray detection sensors 407, 408, and 409. The sorting apparatus control unit 303 detects whether the discharge trays 210, 211, and 212 are fully loaded, based on detection results of the full load detection sensors 404, 405, and 406.

<Details of Sorting Apparatus Control Unit>

Figure 3:
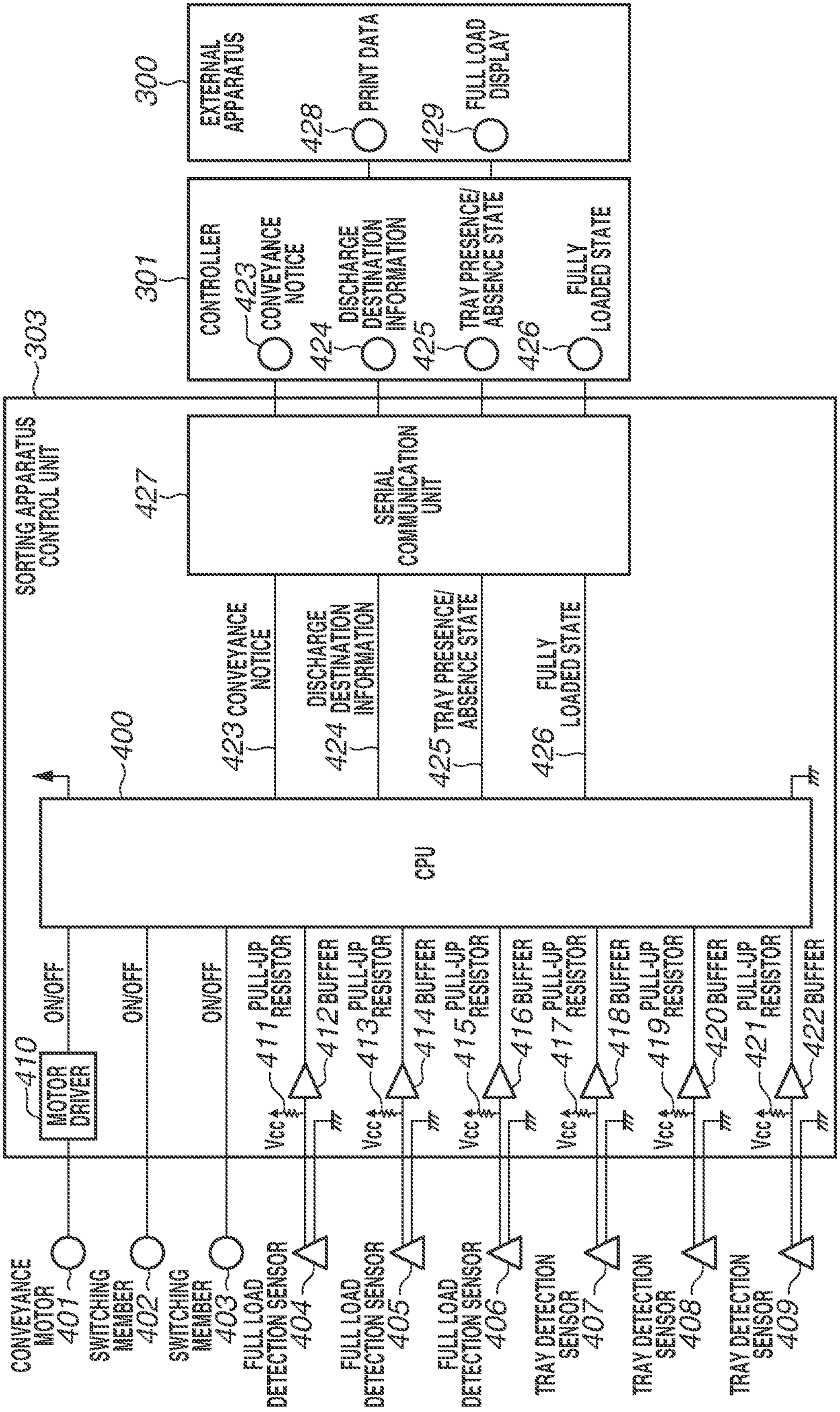
FIG. 3 is a detailed diagram of a sorting apparatus control unit according to the first exemplary embodiment.

FIG. 3 is a detailed diagram of the sorting apparatus control unit 303 according to the present exemplary embodiment. The sorting apparatus control unit 303 includes a central processing unit (CPU) 400, and communicates with the controller 301 via a serial communication unit 427. The serial communication unit 427 connects the CPU 400 and the controller 301 by a plurality of signal lines.

If the controller 301 is notified of print data 428 through the external apparatus 300, the controller 301 notifies the CPU 400 of a signal of conveyance notice 423 and discharge destination information 424 via the serial communication unit 427. The CPU 400 notifies the controller 301 of a signal of a tray presence/absence state 425 via the serial communication unit 427. If the CPU 400 notifies the controller 301 of a signal of a fully loaded state 426 via the serial communication unit 427, the controller 301 notifies the external apparatus 300 of a full load display 429. As employed herein, notifying the external apparatus 300 of the full load display 429 means displaying, on a screen of the external apparatus 300, a message or image for making a notification that the tray for the sheet S to be discharged to is fully loaded. A target device to display the message or image for making a notification of full load is not limited to the external apparatus 300. The printer 100 or the sheet sorting apparatus 200 can include a liquid crystal panel (display unit), and the message or image can be displayed on the liquid crystal panel.

A motor driver 410 is connected to an output terminal of the CPU 400. The motor driver 410 drives a conveyance motor 401. Rotation of the conveyance motor 401 rotates the conveyance roller pair 202 and the discharge roller pairs 601, 602, and 603, whereby the sheet S is conveyed to the discharge trays 210, 211, and 212, respectively.

An actuator (not illustrated) for switching the position of the switching member 402 is connected to an output terminal of the CPU 400. With the actuator ON, the switching member 402 is switched to the broken-lined position in FIG. 1, whereby the sheet S is guided toward where the discharge tray 211 is. With the actuator OFF, the switching member 402 is switched to the solid-lined position in FIG. 1, whereby the sheet S is guided toward where the discharge tray 210 is.

An actuator (not illustrated) for switching the position of the switching member 403 is connected to an output terminal of the CPU 400. With the actuator ON, the switching member 403 is switched to the broken-lined position in FIG. 1, whereby the sheet S is guided toward where the discharge tray 212 is. With the actuator OFF, the switching member 403 is switched to the solid-lined position in FIG. 1, whereby the sheet S is guided toward where the discharge trays 210 and 211 are.

The full load detection sensor 404 inputs a sensor state (ON signal or OFF signal) to the CPU 400 by using a pull-up resistor 411 and via a buffer 412. The full load detection sensor 404 is a signal output unit for outputting a signal according to the position of the full load detection flag 206. Details of the full load detection sensors 405 and 406 are similar to those of the full load detection sensor 404, and a description thereof will thus be omitted. The full load detection sensors 405 and 406 correspond to the full load detection flags 207 and 208, respectively.

The tray detection sensor 407 inputs a sensor state (ON signal or OFF signal) to the CPU 400 by using a pull-up resistor 417 and via a buffer 418. Details of the tray detection sensors 408 and 409 are similar to those of the tray detection sensor 407, and a description thereof will thus be omitted.

<Description of Operation of Sheet Sorting Apparatus>

An operation of the sheet sorting apparatus 200 according to the present exemplary embodiment will be described with reference to FIGS. 4A and 4B to FIG. 7. A case where the discharge tray 211 is fully loaded will be described here.

Figure 5:
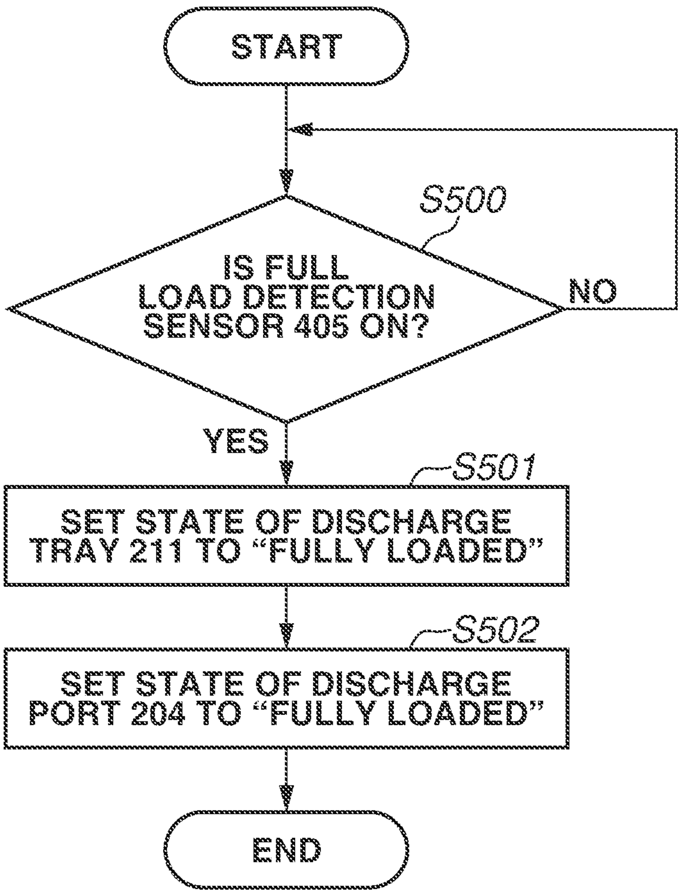
FIG. 5 is a flowchart when the fully loaded state is detected according to the first exemplary embodiment.

FIG. 5 is a flowchart to be performed in a case where sheets S are discharged to the discharge tray 211. The control based on the flowchart of FIG. 5 is performed by the controller 301 illustrated in FIG. 2, based on a program stored in a storage unit such as a read-only memory (ROM) and a random access memory (RAM).

Figure 4A:
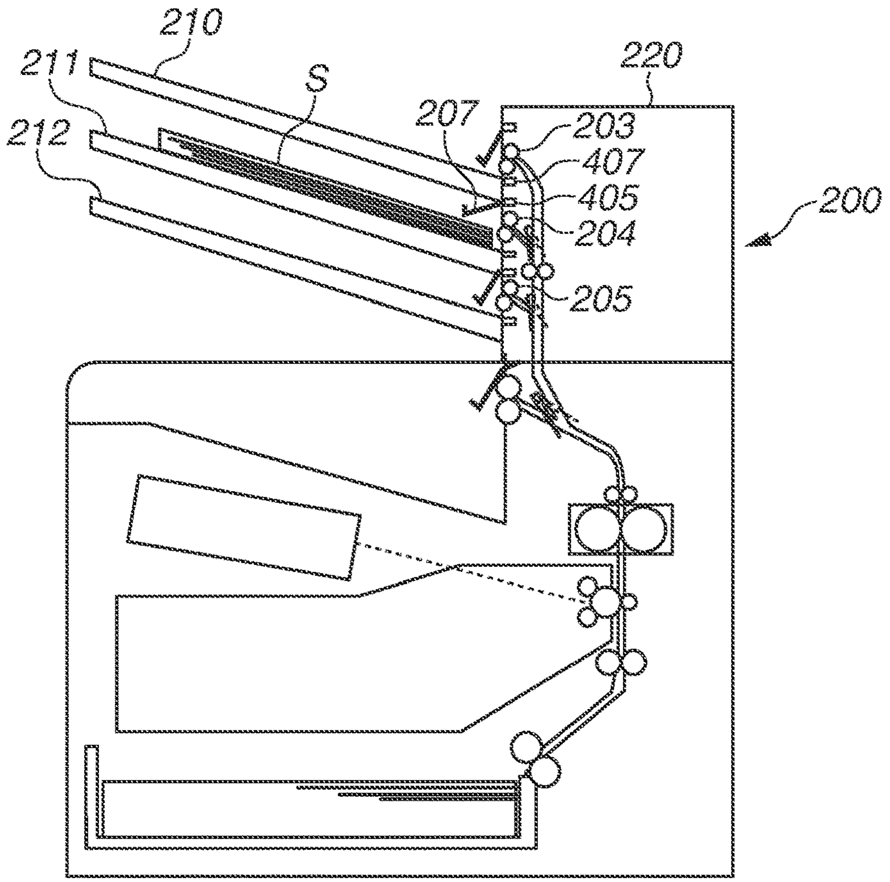
FIGS. 4A and 4B are diagrams illustrating cases where a fully loaded state is detected and where a discharge tray is detached according to the first exemplary embodiment.

In step S500, while sheets S are discharged to the discharge tray 211, the controller 301 checks whether the full load detection sensor 405 is ON. In a case where the full load detection sensor 405 is OFF (NO in step S500), the processing returns to step S500. That is, the controller 301 continues to discharge sheets S to the discharge tray 211. In a case where, as illustrated in FIG. 4A, the discharge tray 211 is fully loaded and the full load detection sensor 405 is ON (YES in step S500), the processing proceeds to step S501. In step S501, the controller 301 sets a state of the discharge tray 211 to "fully loaded". In FIG. 4A, the apparatus main body 220 has discharge ports 203, 204, and 205 at positions corresponding to the discharge trays 210, 211, and 212, respectively. In step S502, the controller 301 also sets a state of the discharge port 204 corresponding to the discharge tray 211 to "fully loaded". FIG. 6A is a table summarizing such a state of setting. In the state of FIG. 6A, the controller 301 prohibits the discharge of sheets S to the discharge tray 211. The processing of the present flowchart ends.

Figure 7:
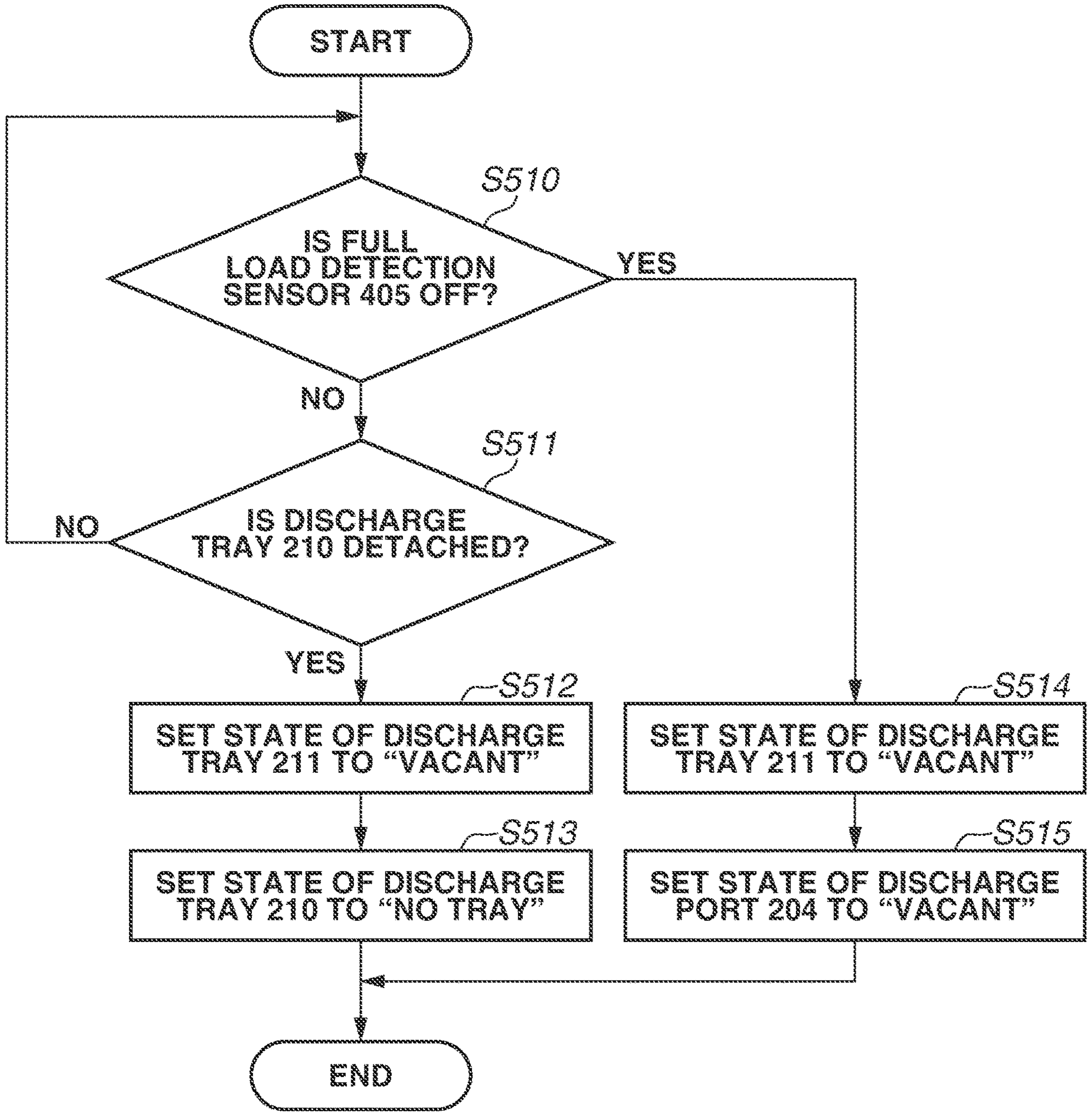
FIG. 7 is a flowchart when the fully loaded state is cancelled according to the first exemplary embodiment.

FIG. 7 is a flowchart to be performed after the discharge tray 211 is fully loaded. The control based on the flowchart of FIG. 7 is performed by the controller 301 illustrated in FIG. 2 based on a program stored in the storage unit such as a ROM and a RAM.

In step S510, after the discharge tray 211 is fully loaded, the controller 301 checks whether the full load detection sensor 405 is OFF. In a case where the full load detection sensor 405 is OFF (YES in step S510), the processing proceeds to step S514. In step S514, the controller 301 changes the state of the discharge tray 211 to "vacant". In step S515, the controller 301 changes the state of the discharge port 204 to "vacant". FIG. 6C is a table summarizing such a state of setting. In the state of FIG. 6C, the controller 301 permits the discharge of sheets S to the discharge tray 211. The reason is that, in a case where the full load detection sensor 405 is OFF, the fully loaded state can be determined to be cancelled by a user removing the sheets S stacked on the discharge tray 211.

Figure 4B:
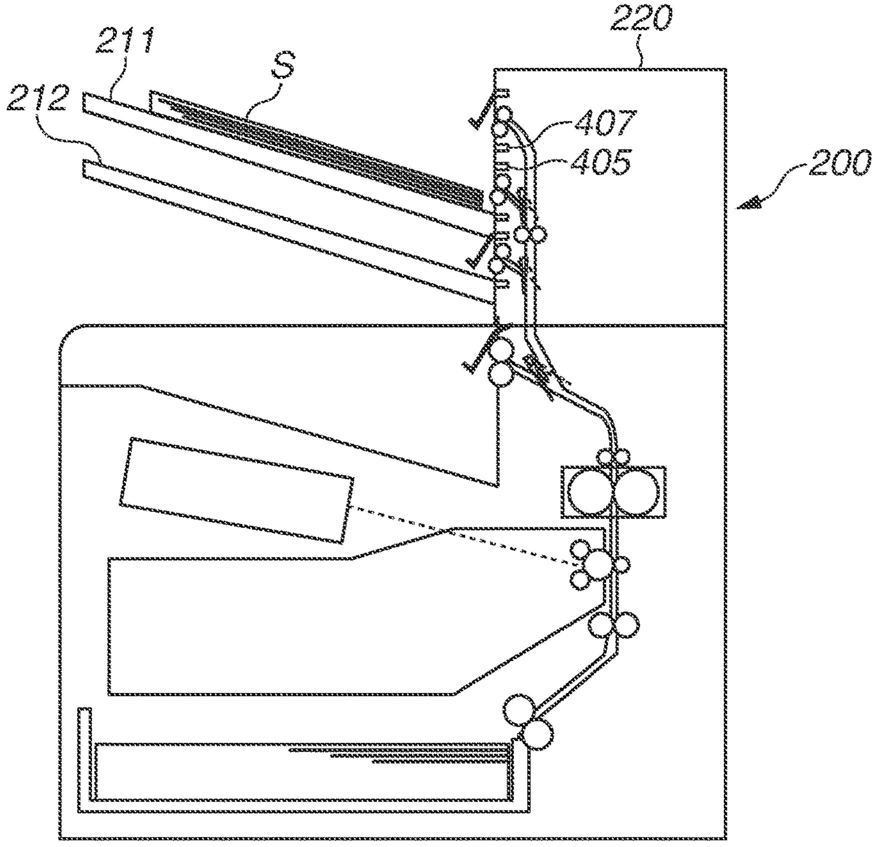

On the other hand, in a case where the full load detection sensor 405 is ON (NO in step S510), the processing proceeds to step S511. In step S511, the controller 301 checks whether the discharge tray 210 is detached from the apparatus main body 220. In a case where the discharge tray 210 is not detached (NO in step S511), the processing returns to step S510. That is, the controller 301 repeats the checks in steps S510 and S511. On the other hand, in a case where, as illustrated in FIG. 4B, the discharge tray 210 arranged above the discharge tray 211 is detached from the apparatus main body 220 (YES in step S511), the processing proceeds to step S512. In step S512, the controller 301 changes the state of the discharge tray 211 to "vacant". In step S513, the controller 301 changes the state of the discharge tray 210 to "no tray". FIG. 6B is a table summarizing such a state of setting. In the state of FIG. 6B, the controller 301 permits the discharge of sheets S to the discharge tray 211. As illustrated in FIG. 4B, with the discharge tray 210 detached, the sheet stacking space of the discharge tray 211 is extended to increase the maximum number of sheets S stackable on the discharge tray 211. The controller 301 can thus automatically cancel the fully loaded state of the discharge tray 211. The processing of the present flowchart ends.

<Description of Method for Selecting Discharge Port>

A method for selecting the discharge ports 203, 204, and 205 by the controller 301 will be described with reference to FIGS. 6A to 6C.

In the state of FIG. 6A, as described above, the controller 301 notifies the external apparatus 300 that the discharge tray 211 is fully loaded, and stops a printing operation. In a case where the state transitions to that of FIG. 6B while the printing operation is stopped with the notification of the fully loaded state, the controller 301 cancels the fully loaded state of the discharge tray 211, specifies the sheet sorting apparatus 200 to discharge sheets S from the discharge port 203 to the discharge tray 211, and resumes printing. The reason why sheets S are discharged not from the discharge port 204 but from the discharge port 203 is that the state of the discharge port 204 is still "fully loaded" in FIG. 6B. More specifically, sheets S are already stacked on the discharge tray 211 up to near the discharge port 204, and the already stacked sheets S can interfere with a new sheet S to cause a conveyance malfunction if the new sheet S is discharged from the discharge port 204. According to the configuration of the present exemplary embodiment, the full load detection flag 207 is detached from the apparatus main body 220 along with the discharge tray 210. Even if sheets S are discharged from the discharge port 203 to the discharge tray 211, the full load detection flag 207 therefore will not intervene to lower the stackability of the sheets S.

Now, in a case where the state transitions to that of FIG. 6C while the printing operation is stopped with the notification of the fully loaded state, the controller 301 cancels the fully loaded state of the discharge tray 211, specifies the sheet sorting apparatus 200 to discharge sheets S from the discharge port 204 to the discharge tray 211, and resumes printing. That is, the sheets S are discharged from a discharge port different from that in the state of FIG. 6B.

As described above, according to the present exemplary embodiment, usability in a case where the discharge tray arranged above the one detected to be fully loaded is detached from the apparatus main body 220 can be improved.

In the foregoing first exemplary embodiment, the full load detection flag 207 and the discharge tray 210 are described to be integrally configured. However, the full load detection flag 207 and the discharge tray 210 can be configured to be separately detachable. Only the discharge tray 210 can be configured to be detachable. If the full load detection flag 207 is not detachable from the apparatus main body 220, the full load detection flag 207 can be configured to be retractable into the apparatus main body 220 so that the discharge of sheets S from the discharge port 203 to the discharge tray 211 are not interfered.

In the above first exemplary embodiment, the full load detection flags 206 to 208 of a flag type are described to be used. A present second exemplary embodiment describes a configuration using full load detection sensors that detect fully loaded states of discharge trays by counting the numbers of sheets discharged to the discharge trays. A description of main parts is similar to that of the first exemplary embodiment. Only differences from the first exemplary embodiment will be described here.

<Configuration Diagram of Sheet Sorting Apparatus>

Figure 8:
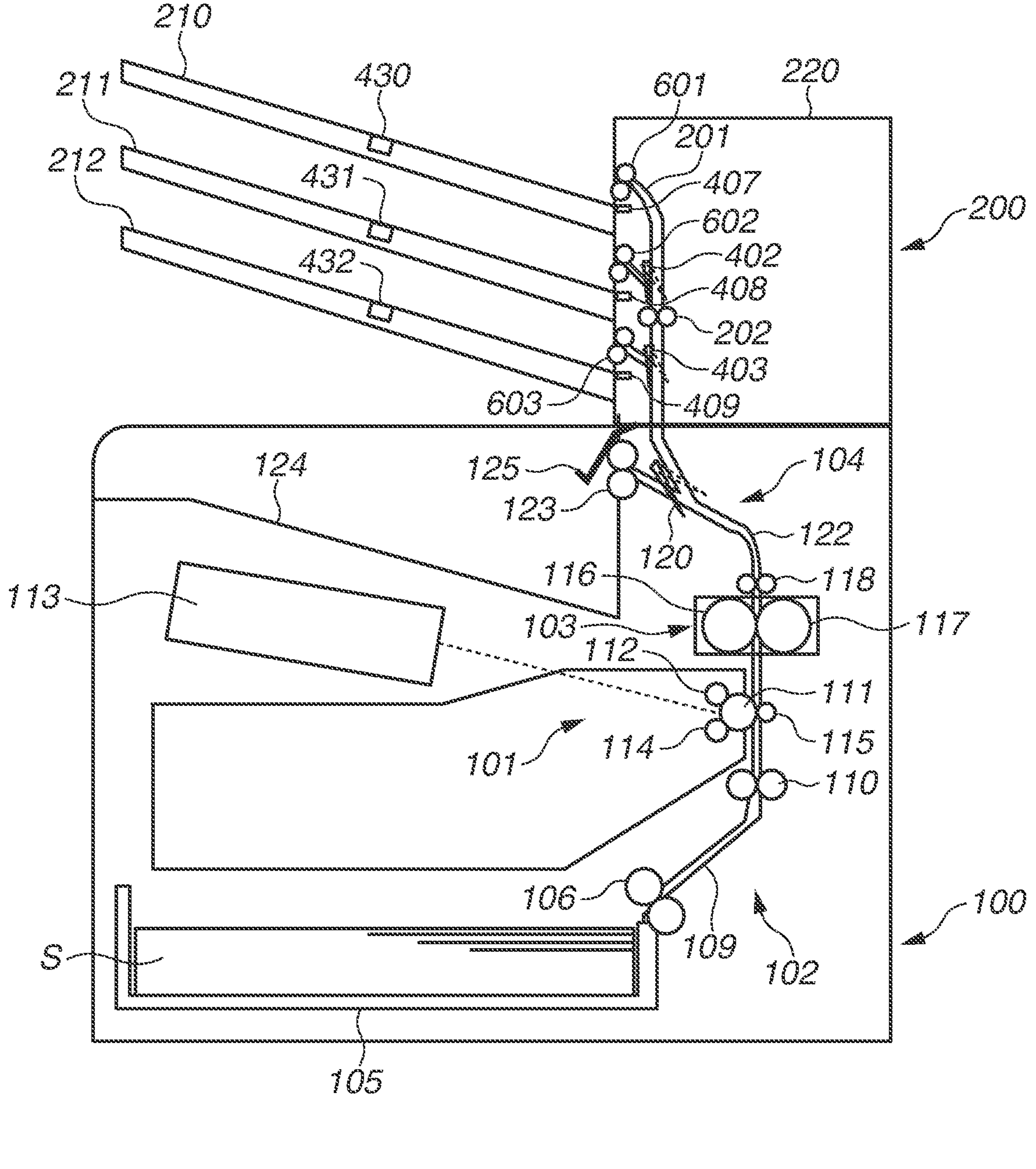
FIG. 8 is a diagram illustrating a configuration of an image forming apparatus and a sheet sorting apparatus according to a second exemplary embodiment.

A sheet sorting apparatus 200 according to the present exemplary embodiment will be described with reference to FIG. 8. A difference from the first exemplary embodiment is the provision of sheet detection sensors 430, 431, and 432. The sheet detection sensors 430, 431, and 432 are sensors for detecting a presence or an absence of sheets S stacked on the discharge trays 210, 211, and 212, respectively. For example, the sheet detection sensors 430, 431, and 432 are photointerrupters. The sheet detection sensors 430, 431, and 432 output an OFF signal in a light transmission state where no sheet S is stacked on the discharge trays 210, 211, and 212 and the light of the respective photointerrupters is not blocked by not-illustrated flags. The sheet detection sensors 430, 431, and 432 output an ON signal in a light blocked state where sheets S are stacked on the discharge trays 210, 211, and 212 and the light of the respective photointerrupters is blocked by the not-illustrated flags. Unlike the first exemplary embodiment, the sheet sorting apparatus 200 according to the present exemplary embodiment includes neither the full load detection flags 206, 207, and 208, nor the full load detection sensors 404, 405, and 406.

<Block Diagram of Control Units and Functional Configuration>

Figure 9:
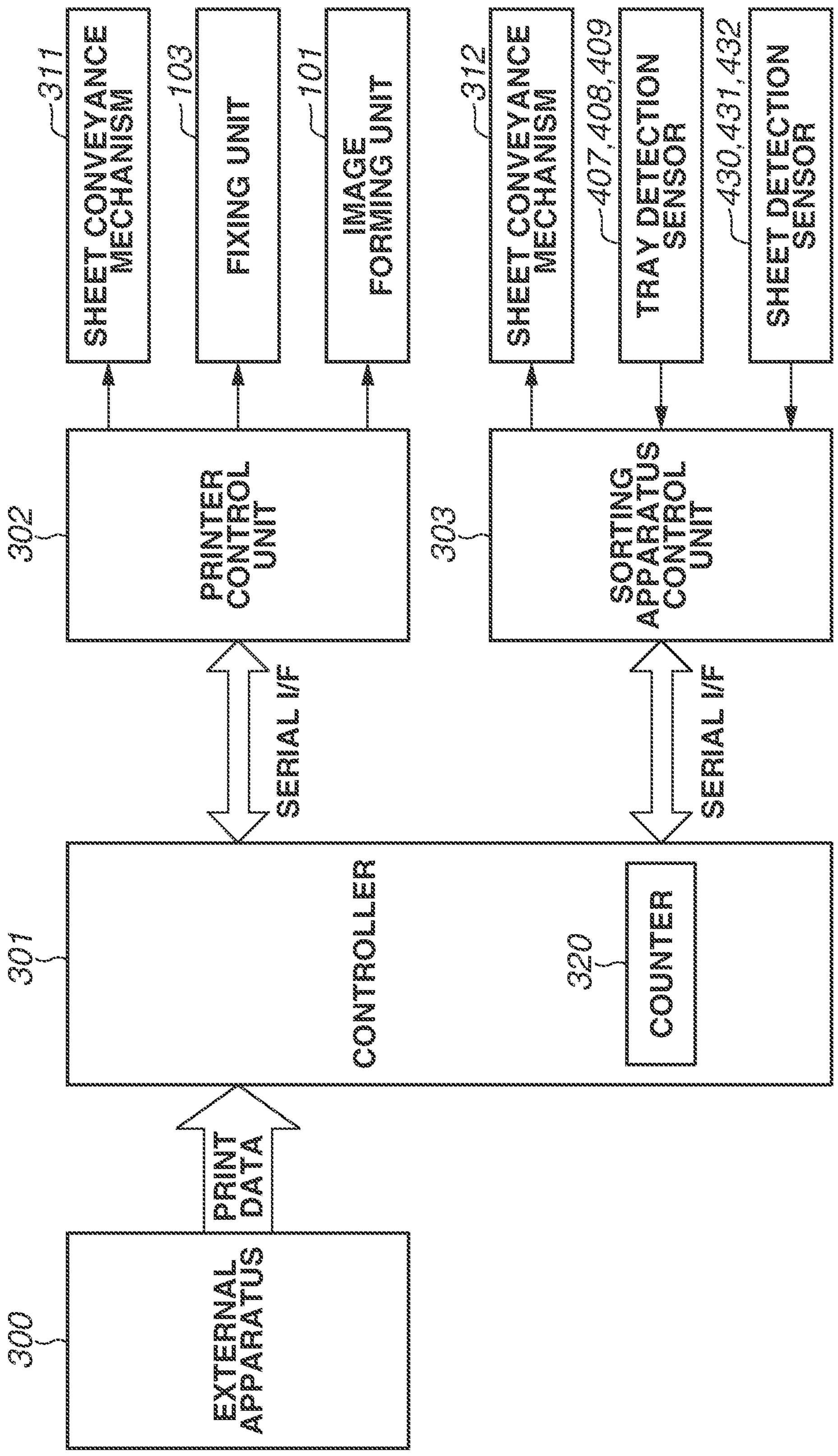
FIG. 9 is a block diagram illustrating a control unit and a functional configuration of the image forming apparatus according to the second exemplary embodiment.

FIG. 9 is a block diagram illustrating a functional configuration according to the present exemplary embodiment. A difference from the first exemplary embodiment is that the controller 301 includes a counter 320 for counting the numbers of sheets S discharged to the discharge trays 210, 211, and 212. The counter 320 can be included in the sorting apparatus control unit 303. The sorting apparatus control unit 303 detects the presence or the absence of sheets S stacked on the discharge trays 210, 211, and 212 based on detection results of the sheet detection sensors 430, 431, and 432.

<Details of Sorting Apparatus Control Unit>

Figure 10:
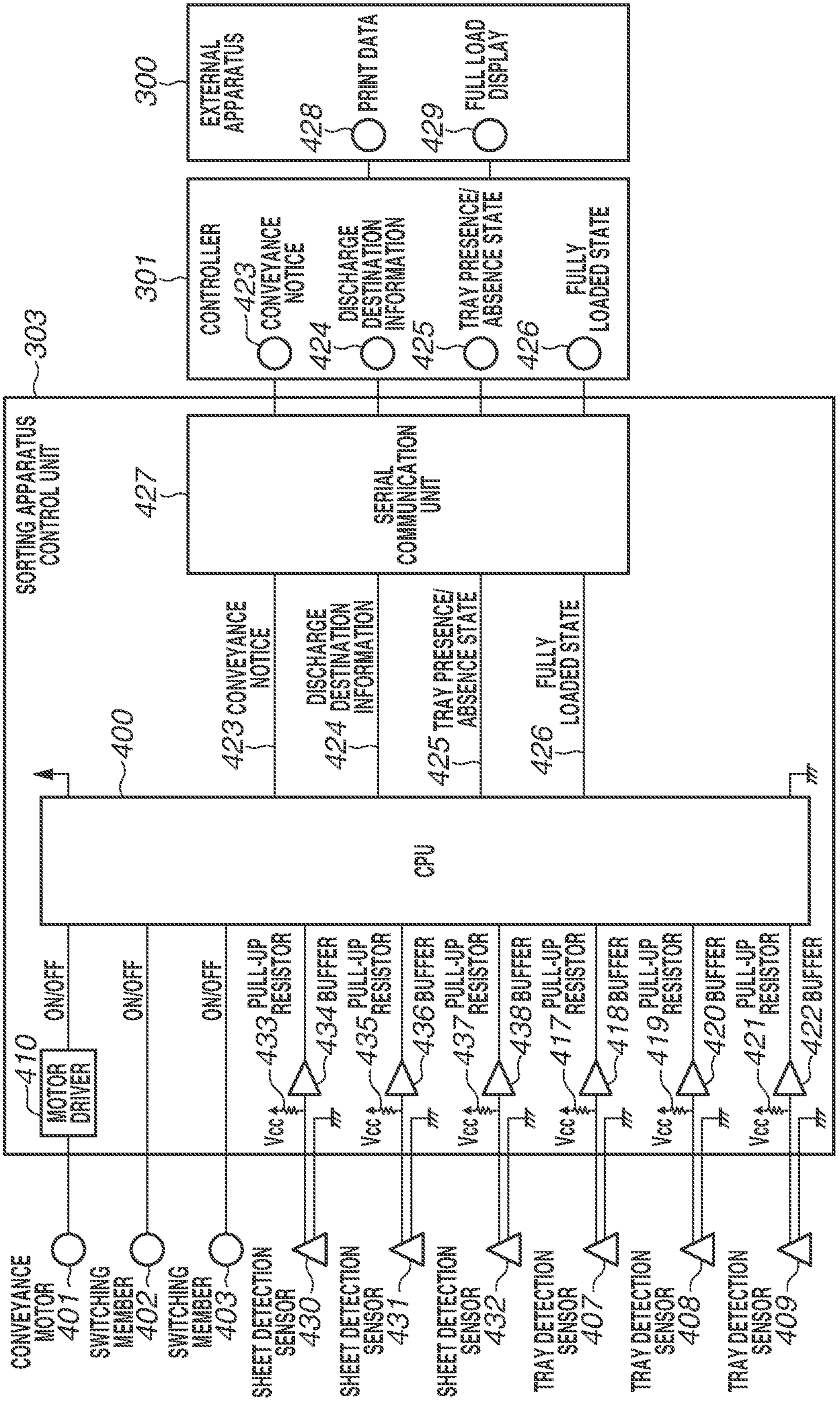
FIG. 10 is a detailed diagram of a sorting apparatus control unit according to the second exemplary embodiment.

FIG. 10 is a detailed diagram illustrating the sorting apparatus control unit 303 according to the present exemplary embodiment. The sheet detection sensor 430 inputs a sensor state (ON signal or OFF signal) to the CPU 400 by using a pull-up resistor 433 and via a buffer 434. Details of the sheet detection sensors 431 and 432 are similar to those of the sheet detection sensor 430. A description thereof will thus be omitted.

<Description of Operation of Sheet Sorting Apparatus>

An operation of the sheet sorting apparatus 200 according to the present exemplary embodiment will be described with reference to FIG. 11. A case where the discharge tray 211 is fully loaded will be described below.

Figure 11:
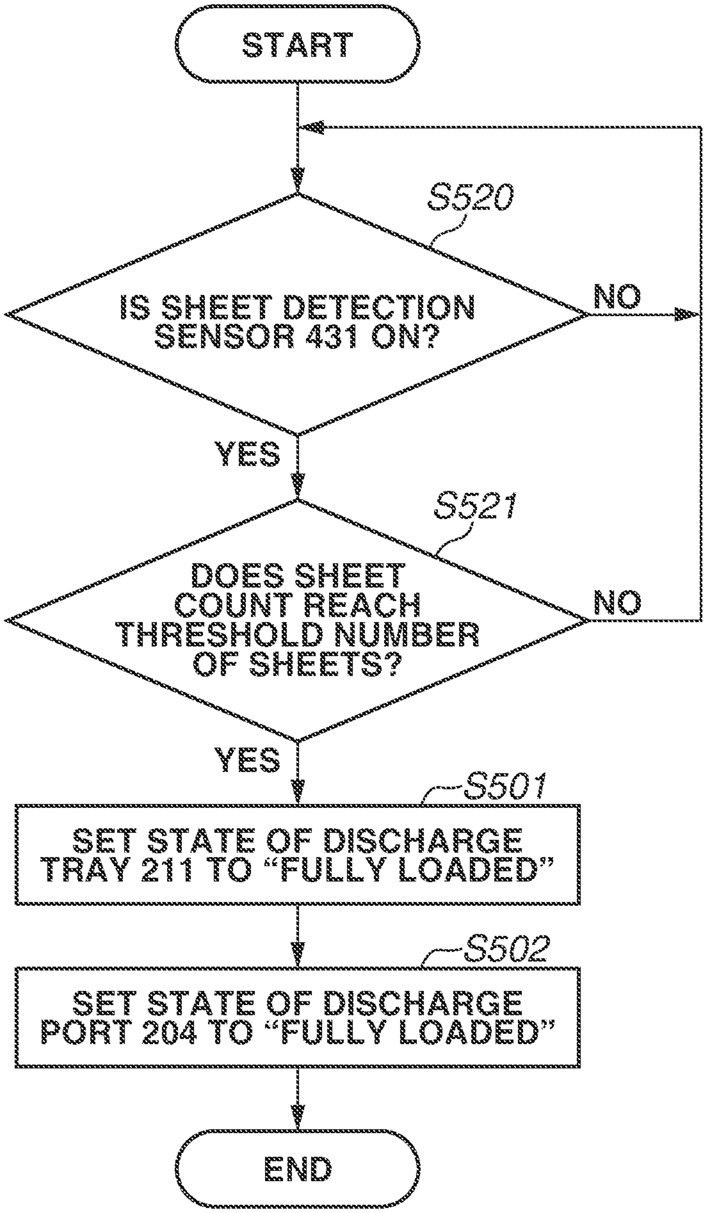
FIG. 11 is a flowchart when a fully loaded state is detected according to the second exemplary embodiment.

FIG. 11 is a flowchart performed when sheets S are discharged to the discharge tray 211. The control based on the flowchart of FIG. 11 is performed by the controller 301 illustrated in FIG. 9 based on a program stored in a storage unit such as a ROM and a RAM.

In step S520, while sheets S are discharged to the discharge tray 211, the controller 301 checks whether the sheet detection sensor 431 is ON. In a case where the sheet detection sensor 431 is OFF (NO in step S520), the processing returns to step S520. That is, the controller 301 continues detection. In a case where the sheet detection sensor 431 is ON (YES in step S520), the processing proceeds to step S521. The counter 320 counts the number of sheets S discharged to the discharge tray 211. In step S521, the controller 301 checks whether the sheet count reaches a predetermined threshold number of sheets. In a case where the sheet count does not reach the threshold number of sheets (NO in step S521), the processing returns to step S520. That is, the controller 301 continues to discharge sheets S to the discharge tray 211. In a case where the sheet count reaches the threshold number of sheets (YES in step S521), the processing proceeds to step S501. In step S501, the controller 301 sets a state of the discharge tray 211 to "fully loaded". In step S502, the controller 301 sets a state of the discharge port 204 to "fully loaded". FIG. 6A is the table summarizing such a state of setting. In the state of FIG. 6A, the controller 301 prohibits the discharge of sheets S to the discharge tray 211. The processing of the present flowchart ends.

Figure 12:
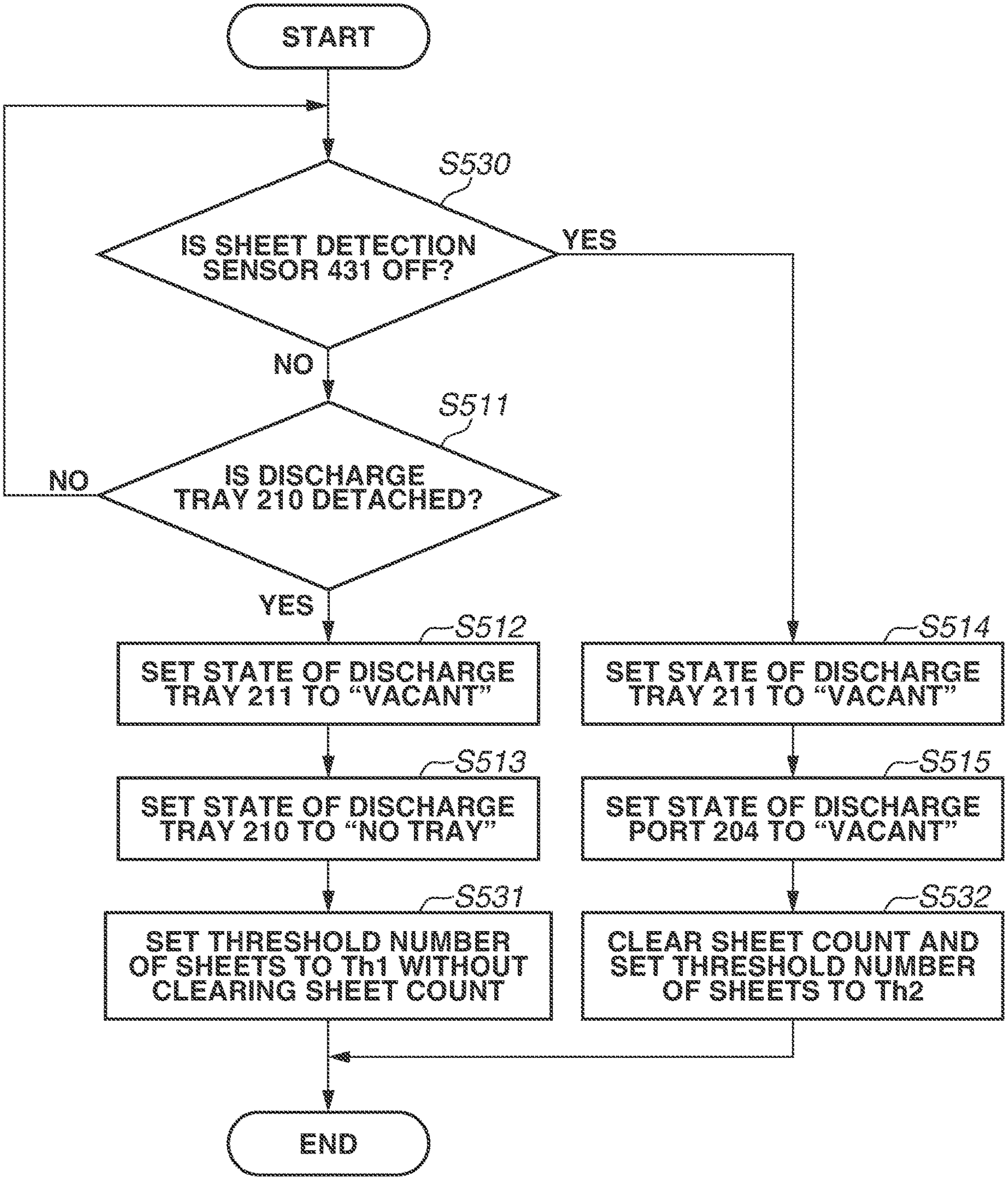
FIG. 12 is a flowchart when the fully loaded state is cancelled according to the second exemplary embodiment.

FIG. 12 is a flowchart to be performed after the discharge tray 211 is fully loaded. The control based on the flowchart of FIG. 12 is performed by the controller 301 illustrated in FIG. 9 based on a program stored in a storage unit such as a ROM and a RAM.

In step S530, after the discharge tray 211 is fully loaded, the controller 301 checks whether the sheet detection sensor 431 is OFF. In a case where the sheet detection sensor 431 is OFF (YES in step S530), the processing proceeds to step S514. In step S514, the controller 301 changes the state of the discharge tray 211 to "vacant". In step S515, the controller 301 changes the state of the discharge port 204 to "vacant". FIG. 6C is the table summarizing such a state of setting. In the state of FIG. 6C, the controller 301 permits the discharge of sheets S to the discharge tray 211. In step S532, the controller 301 clears the number (sheet count) of sheets S discharged to the discharge tray 211, and sets the threshold number of sheets to Th2. Here, the threshold number of sheets Th2 is the maximum number of sheets S stackable on the discharge tray 211 in the state where the discharge tray 210 is attached.

On the other hand, in a case where the sheet detection sensor 431 is ON (NO in step S530), the processing proceeds to step S511. In step S511, the controller 301 checks whether the discharge tray 210 is detached from the apparatus main body 220. In a case where the discharge tray 210 is not detached (NO in step S511), the processing returns to step S530. That is, the controller 301 continues the checks in steps S530 and S511. On the other hand, in a case where the discharge tray 210 is detached (YES in step S511), the processing proceeds to step S512. In step S512, the controller 301 changes the state of the discharge tray 211 to "vacant". In step S513, the controller 301 changes the state of the discharge tray 210 to "no tray". FIG. 6B is the table summarizing such a state of setting. In the state of FIG. 6B, the controller 301 permits the discharge of sheets S to the discharge tray 211. In step S531, the controller 301 sets the threshold number of sheets to Th1 without clearing the number (sheet count) of sheets S discharged to the discharge tray 211. The threshold number of sheets Th1 is the maximum number of sheets S stackable on the discharge tray 211 in the state where the discharge tray 210 is detached to extend the sheet stacking space of the discharge tray 211. The threshold numbers of sheets Th1 and Th2 have a relationship of Th1>Th2. The processing of the present flowchart ends.

In a case where the state transitions to that of FIG. 6B while the printing operation is stopped with the notification of the fully loaded state, the controller 301 cancels the fully loaded state of the discharge tray 211, specifies the sheet sorting apparatus 200 to discharge sheets S from the discharge port 203 to the discharge tray 211, and resumes printing. According to the configuration of the present exemplary embodiment, the full load detection flag 207 is not provided in the first place. If a new sheet S is discharged from the discharge port 203 to the discharge tray 211, the full load detection flag 207 therefore will not intervene to lower the stackability of sheets S.

As described above, according to the present exemplary embodiment, the usability in the case where the discharge tray arranged above the one detected to be fully loaded is detached from the apparatus main body 220 can be improved.

In the foregoing first and second exemplary embodiments, the fully loaded state is described to be always cancelled in a case where the discharge tray arranged on the fully loaded one is detached from the apparatus main body 220. However, such control is not restrictive. In a case where the discharge tray arranged above the fully loaded one is detached from the apparatus main body 220, the user can select via the external apparatus 300 whether to cancel the fully loaded state.

An example of a case where the user does not select to cancel the fully loaded state will be described. Suppose, for example, that small-sized sheets are stacked on a discharge tray up to a fully loaded state. In removing the small-sized sheets, the user may detach the discharge tray arranged above from the apparatus main body 220 because of difficulty in visually observing the small-sized sheets. If the fully loaded state is cancelled in such a case, subsequent sheets can be discharged to the discharge tray while the user is removing the small-sized sheets. This can lower the usability.

If the discharge tray arranged above the fully loaded one is detached from the apparatus main body 220, the controller 301 or the sorting apparatus control unit 303 can automatically select whether to cancel the fully loaded state based on size information about the sheets of paper instructed to be printed. Specifically, in the foregoing example, the controller 301 or the sorting apparatus control unit 303 can select to not cancel the fully loaded state in a case where small-sized sheets are instructed to be printed.

In the foregoing first and second exemplary embodiments, in a case where the discharge tray 210 is detached and the discharge of sheets S to the discharge tray 211 is permitted, the sheets S are discharged from the discharge port 203 to the discharge tray 211. However, this is not restrictive. To minimize a falling distance of sheets S to improve the stackability of the sheets S, the discharge ports 203 and 204 can be switched so that a predetermined number of sheets S can be discharged from the discharge port 204 and then the rest of the sheets S are discharged from the discharge port 203. The precondition to such an operation is that, when the discharge tray 211 is detected to be fully loaded, the discharge port 204 is not yet blocked by the sheets S stacked on the discharge tray 211 and there is still some margin.

In the foregoing first and second exemplary embodiments, the discharge tray 210 is described to be detached in the state where the discharge tray 211 is fully loaded. However, this is not restrictive. An exemplary embodiment of the present invention can be applied to a case where the discharge tray 211 is detached in a state where the discharge tray 212 is fully loaded. In other words, the fully loaded state of a discharge tray arranged below a detached one can be cancelled.

In the foregoing first and second exemplary embodiments, the discharge trays 210, 211, and 212 are all described to be detachable from the apparatus main body 220. However, this is not restrictive. Only the discharge tray 210 can be configured to be detachable, and the discharge trays 211 and 212 can be configured to not be detachable. In other words, at least one discharge tray excluding the one located vertically at the bottom can be configured to be detachable from the apparatus main body 220.

An exemplary embodiment of the present invention can be applied to a case where the discharge tray 212 is detached in a state where the discharge tray 124 of the printer 100 is fully loaded. In such a case, the full load detection flag 125 and the discharge tray 212 are configured to be integrally detached.

In the foregoing first and second exemplary embodiments, the printer control unit 302 and the sorting apparatus control unit 303 are described to be separately configured. However, only the printer control unit 302 can be included. In such a case, the printer control unit 302 controls the sheet sorting apparatus 200.

In the foregoing first and second exemplary embodiments, the sheet sorting apparatus 200 can be configured to be detachably attachable to the printer 100. The sheet sorting apparatus 200 can be fixed to and integrally configured with the printer 100.

In the foregoing first and second exemplary embodiments, the sheet sorting apparatus 200 is described to include the three discharge trays 210, 211, and 212. However, the number of discharge trays is not limited to three. The number of discharge trays can be set according to an environment in which the sheet sorting apparatus 200 is used, the number of users who share the sheet sorting apparatus 200, and/or specifications of the sheet sorting apparatus 200.

In the foregoing first and second exemplary embodiments, the laser beam printer 100 is described as an example. However, an image forming apparatus to which an exemplary embodiment of the present invention is applied is not limited thereto, and can be printers of other printing methods, such as an inkjet printer, or copying machines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

an image forming unit configured to form an image on a sheet:

a first discharge roller configured to discharge the sheet on which the image is formed by the image forming unit;

a first discharge tray, detachable from the image forming apparatus, on which the sheet discharged by the first discharge roller is loaded;

a second discharge roller configured to discharge the sheet on which the image is formed by the image forming unit;

a second discharge tray, arranged below the first discharge tray, on which the sheet discharged by the second discharge roller is loaded;

a full load detection sensor configured to detect full load of the second discharge tray;

a tray detection sensor configured to detect detachment of the first discharge tray; and a control unit configured to allow a user to select whether to permit discharge of sheets to the second discharge tray in a case where the full load detection sensor detects the full load of the second discharge tray and the tray detection sensor detects the detachment of the first discharge tray.

2. The image forming apparatus according to claim 1, further comprising a first discharge port formed at a position corresponding to the first discharge tray, and a second discharge port formed at a position corresponding to the second discharge tray, and wherein the control unit is configured to control a conveyance roller to convey the sheet to the second discharge tray from the first discharge port, not from the second discharge port, in the case where the full load detection sensor detects the full load of the second discharge tray and the tray detection sensor detects the detachment of the first discharge tray.

3. The image forming apparatus according to claim 1, wherein the full load detection sensor includes a flag configured to move in contact with a surface of a sheet conveyed to the second discharge tray and a signal output unit configured to output a signal according to a position of the flag, and the full load detection sensor detects that an amount of sheets reaches a predetermined amount based on the signal output from the signal output unit.

4. The image forming apparatus according to claim 3, wherein the flag is detachable along with the first discharge tray.

5. The image forming apparatus according to claim 1, wherein the full load detection sensor is configured to detect a presence or an absence of a sheet conveyed to the second discharge tray and a counter for counting a number of sheets conveyed to the second discharge tray by a conveyance roller, and the full load detection sensor detects, in a case where the number of sheets counted by the counter in a state where the full load detection sensor detects the sheet reaches a predetermined number of sheets, that an amount of sheets reaches a predetermined amount.

* * * * *